(12) United States Patent
Ozanne

(10) Patent No.: US 8,445,047 B2
(45) Date of Patent: May 21, 2013

(54) APPARATUS FOR PREPARING A BEVERAGE FROM A CAPSULE

(75) Inventor: Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/235,899

(22) Filed: Sep. 19, 2011

(65) Prior Publication Data

US 2012/0060697 A1   Mar. 15, 2012

Related U.S. Application Data

(62) Division of application No. 12/089,561, filed as application No. PCT/EP2006/066946 on Oct. 2, 2006, now Pat. No. 8,039,034.

(30) Foreign Application Priority Data

Oct. 14, 2005 (EP) .................................... 05109564

(51) Int. Cl.
*A23L 1/28* (2006.01)
(52) U.S. Cl.
USPC ............. 426/435; 426/425; 426/431; 426/79; 99/295
(58) Field of Classification Search ............... 426/78, 426/79, 435, 425, 431; 99/295
See application file for complete search history.

(56) References Cited

U.S. PATENT DOCUMENTS

| | | | |
|---|---|---|---|
| 4,527,467 A | 7/1985 | Siemensma | |
| 5,927,179 A | 7/1999 | Mordini et al. | |
| 6,250,208 B1 * | 6/2001 | Helps et al. | 99/299 |
| 6,279,460 B1 | 8/2001 | Pope | |
| 2002/0148356 A1 | 10/2002 | Lazaris et al. | |
| 2002/0148357 A1 | 10/2002 | Lazaris et al. | |
| 2003/0005826 A1 | 1/2003 | Sargent et al. | |
| 2003/0209151 A1 | 11/2003 | Mordini et al. | |
| 2004/0103792 A1 | 6/2004 | Cirigliano et al. | |
| 2005/0115415 A1 | 6/2005 | Arrick et al. | |

FOREIGN PATENT DOCUMENTS

| | | |
|---|---|---|
| EP | 0 512 470 | 11/1992 |
| EP | 0 615 921 | 9/1994 |
| EP | 1 101 430 | 5/2001 |
| EP | 1 440 904 | 7/2004 |
| GB | 1 397 116 | 6/1975 |
| GB | 2 235 868 | 3/1991 |

OTHER PUBLICATIONS

Written Opinion of the International Searching Authority (5 pgs.).

* cited by examiner

*Primary Examiner* — Rena Dye
*Assistant Examiner* — Chaim Smith
(74) *Attorney, Agent, or Firm* — K&L Gates LLP

(57) ABSTRACT

A method for preparing a beverage through a capsule inserted in a beverage machine; the capsule comprising an enclosure containing one or more beverage ingredients, wherein a brewing fluid is introduced in the enclosure to brew the said one or more beverage ingredients, wherein a brewed liquid is filtered by a filtering wall and delivered from the capsule, wherein the filtering wall extends from substantially the bottom of the enclosure and said filtering wall is associated to an overflow wall that forces the brewed liquid to traverse at least one overflow aperture. The method is particularly suitable for brewing a tea containing capsule.

9 Claims, 16 Drawing Sheets

APPARATUS FOR PREPARING A BEVERAGE FROM A CAPSULE

CROSS REFERENCE TO RELATED APPLICATIONS

This application is a divisional application of U.S. patent application Ser. No. 12/089,561, now U.S. Pat. No. 8,039,034 filed Jul. 28, 2008, which is a U.S. National Phase of PCT/EP06/066946, filed Oct. 2, 2006, which claims priority to European Patent Application 05109564.4, filed Oct. 14, 2005, the entire content of which is hereby incorporated by reference.

BACKGROUND

The present invention relates to a method for preparing and delivering a beverage from a capsule that contains one or more beverage ingredients. The present invention more particularly aims at providing a method for brewing tea from capsules and a beverage machine although other beverages can be successfully brewed by this method.

SUMMARY

Different beverage preparation methods using capsules to be brewed in a suitable beverage machine are known. However, there is no existing method that can deliver a high quality tea beverage from a capsule containing leaf tea product.

Quality of a tea beverage is highly dependent on the quality of the leaf tea ingredients, i.e., the tea origin used (soil, drying, blending, etc.) and their storage conditions. For instance, tea ingredients are usually sensitive to oxygen and light. Preferred tea ingredients are taken from loose leaves, chiseled or broken in small fragments. However, brewing conditions are also important to take full advantage of the quality of the starting ingredients used.

Another problem with tea beverages resides in that taste cross-contamination must be preferably avoided. Taste cross-contamination happens when two capsules are sequentially brewed in the machine and when a taste residue is left by the first capsule on permanent parts of the machine that can consequently affect the taste of the second capsule which is brewed just after the first capsule. For tea, this can be an issue with certain tea varieties that deliver a high aroma profile such as mint tea or other highly flavoured varieties. Also tea residue may constitute a soil for bacterial growth and may lead to hygiene issues which need to be tackled.

One commercially successful method for extracting coffee beverage from capsules consists in placing an air- and water-impermeable capsule into an extraction device, injecting hot water into the capsule until the internal pressure in the capsule reaches the value at which a closing membrane is torn or pierced so that liquid extract can be released out of the capsule. A method on such a principle is described in EP 0 512 470. This method provides a high quality espresso-type coffee. The ground coffee is filled in the capsule fresh and can be stored many months without significant loss of aroma. The release of the coffee is slightly delayed due to a retarded opening of the membrane under pressure from the time water starts to be injected in the capsule. As a result, coffee can be fully extracted under optimal pressure and heat conditions. A stable and thick crema or foam is also produced due to high stress, pressure release and gas-entrapment conditions which are specific to this method.

However such method is not suitable for carrying out the infusion or brewing of beverages such as tea or herbal tea. The result obtained is poor in term of taste, the beverage has a too high turbidity and may also comprise an undesired foam layer. Therefore, surprisingly a premium quality of tea beverage cannot be reached by such method.

Other methods using pressure for brewing product containing capsules can only deliver tea beverages that are too turbid, of poor product concentration and/or of taste that is not of sufficient quality for tea experts.

Capsules containing roast and ground coffee in which hot water flows under gravimetric force through the capsule are known. A capsule of this general type is described in British Patent No. 1397116. In this method, water is injected from the top of the cartridge and flows down through the ground coffee, through a filter and finally through a piercing hole or holes of the bottom side. More sophisticated systems are based on a similar approach using trunco-conical cartridges such as in US 2002/0148356 or using rectangular cartridges such as in US 2002/0148357.

EP 0 615 921 relates to a rigid cartridge for coffee, leaf tea or chocolate. The beverage package is used with water flowing in an upward direction. The sidewall of the package is formed from a water-impermeable material in order to encourage an even flow of water through the beverage package. One issue is that freshness of the ingredients cannot be maintained long enough unless an additional airtight package is utilized to over wrap the cartridge. Another problem with such solution lies in that beverage cannot be properly conducted to the recipient (cup, mug, glass, . . . ) after being released from the package.

EP 1 101 430 relates to a beverage filter cartridge system in which pressurized water (about 1.4 to 1.7 bar) is provided in downward direction through the upper side of the cartridge and beverage is collected from a lower side of the cartridge. This document also contemplates the solution in which the pressurized hot water is introduced through the bottom side and upwards into the beverage product. However, in this solution, the inlet traverses the filter and the product cake from bottom to the top and water flows finally downward both through the fluid medium ingredients down to a bottom outlet. According to the patent application, the introduction of pressurized hot water squeezes the beverage powder into a cake and permeates the powder more efficiently.

EP 1 440 904 A1 relates to a cartridge with a bottom lid that is pierceable in use when the cartridge is in a horizontal orientation to accommodate both inflow and outflow of an aqueous medium to form the beverage from interaction of the medium and the one or more beverage ingredients in the chamber. According to this document, the horizontal positioning of the cartridge during use allows for an optimised flow of the aqueous medium through the cartridge whereas, with vertically oriented cartridges, the water flows too quickly under the influence of gravity and may thus by-pass portions of the beverage ingredients. Therefore, this document claims that a horizontally oriented cartridge allows avoiding this problem, in particular, by arranging for an upward element of flow between the inlet and outlet positions.

However, one has surprisingly found that the darker brewed beverage portion tends to stay in the bottom of the cartridge because of its density that is higher than the rest of the beverage. Therefore, a beverage concentration gradient tends to form within the capsule with the denser beverage portion remaining in the bottom of the capsule; such portion being finally not delivered into the cup. As a result, the resulting tea beverage in the cup may be of insufficient quality despite the use of good quality starting ingredients.

Therefore, there is a need to overcome this problem.

In the present application, the terms "capsule" or "cartridge" or "package" are considered as synonymous. The term "capsule" will be preferentially used. The words "brewing" or "infusion" are used as synonymous. The term "brewing fluid" generally refers to the liquid that serves to infuse the beverage ingredients, more generally, hot water.

In the present application, the term "tea" encompasses all type of leaf tea such as green tea, black tea, white tea, chai tea, flavoured tea and herbal, fruit tea and combinations thereof. The term "leaf tea" or "leaf ingredient" refers to brewable tea or other ingredients in whatever form such as complete, cut or chiseled leaves, small fragments of leaves, powder or dust.

The present invention provides a new way to brew or infuse beverage from a beverage capsule in a beverage machine that provides the following advantages:

a method that improves quality of the beverage, in particular, that provides a proper beverage concentration into the cup, a good taste and a reduced turbidity, a method that involves a capsule that is less complicated and less expensive to produce, a method that provides a cleaner beverage delivery and reduces or eliminates the taste cross-contamination and hygiene issues, a method that also improves the convenience in the capsule handling, i.e., insertion and collection of the used capsules.

For these purposes as well as many others possible, the invention relates to a method for preparing a beverage through a capsule inserted in a beverage machine; the capsule comprising an enclosure containing one or more beverage ingredients, wherein a brewing fluid is introduced in the enclosure, preferably injected in the enclosure, to brew the said one or more beverage ingredients, wherein a brewed liquid is filtered by a filtering wall and delivered from the capsule.

Furthermore, an overflow wall is placed in association with the filtering wall and the filtered liquid traversing the filtering wall is forced to pass at least one overflow aperture of the overflow wall.

Preferably, the overflow aperture is situated at least above the median horizontal plane of the enclosure. The overflow wall is configured such that at least a portion of the brewed liquid that is filtered through the filtering means is forced to move upwardly after the filtering means to overcome the overflow aperture. This portion of liquid is preferably at least the denser portion located in the enclosure.

Therefore, according to one aspect of the method of the invention, and without willing to be bound to any theoretical model, an effect similar to a "siphon" can be obtained that acts to enable the denser liquid to leave the capsule and to become dispensed, while at the same time, the beverage ingredients are submerged by the fluid therefore avoiding bypassing areas and ensuring that the mass of ingredient fully interacts with the brewing fluid.

As a result, the method of the invention combines, both the advantages of the gravimetric top-down directional brewing where the denser liquid can be captured and the advantages of the upward directional brewing where the full mass of product can be fully and slowly submerged but however does not carry the disadvantages of each of said brewing principles.

In one mode, the filtering means is a wall.

Preferably, the filtering means extends from a level situated below the overflow aperture(s) so that the lower portion of the filtered brewed liquid is forced to move upwards to the overflow aperture. Preferably, the filtering means is adjacent to the overflow wall. Preferably, the filtering wall extends substantially along a whole transversal section of the enclosure, more preferably substantially from the bottom of the enclosure to the top of the enclosure. This the filtering wall creates thus a sufficiently large filtering surface for the brewed liquid that favours a lower brewing pressure in the enclosure and a slow flow velocity while the flow rate can stay within the acceptable range.

In one aspect, the overflow wall is placed separately in front of the filtering wall with an interstitial space there between. This configuration seems to promote the "siphon" effect with the denser liquid in the bottom of the enclosure being able to traverse the filtering wall and moves upwardly in the interstitial space. The denser liquid is thus no longer confined in the bottom of the enclosure but can be drawn out through the interstitial space so formed. The dimensions of the interstitial space can range of from 0.1 to 8 mm, preferably, about 0.5 to 3 mm.

In one aspect, the overflow aperture is situated above the ¾ of the height of the enclosure; even preferably, the aperture is substantially horizontally aligned with the top end of the enclosure. As a result the whole mass of the beverage ingredients can be properly submerged and consequently properly brewed regardless of the filling level of the enclosure by the beverage ingredients.

In another aspect of the invention, noticeable improvements of the quality of the beverage have been obtained when the fluid injection pressure is kept minimal. In particular, the beverage was found less turbid and the beverage taste has even been found better. Therefore, by the method of the invention, the brewing fluid enters the enclosure at a relative pressure below 0.2 bar, preferably, below 0.1 bar and most preferably from atmospheric pressure to a value below 0.1 bar.

In the present context, the "relative pressure" is meant to be the pressure that is measured just outside of the fluid inlet of the capsule (and downstream an eventual backpressure valve) and refers to the value of pressure above the ambient atmospheric pressure.

In one embodiment of the invention, the filtering means is a pre-fabricated filter and the overflow wall is a sealing wall of the capsule that is opened before brewing. This configuration provides the advantage of lesser interaction between the capsule and the machine, so that less hygiene or contamination issues can arise.

According to the method of the invention, a pre-fabricated filtering means is meant to be a filter media which has the function to remove undesirable insoluble particles from the brewed liquid. The filter media can be constructed from a variety of materials including, but not limited to, plastic, foil, non-woven polyester, polypropylene, polyethylene, paper materials, and combinations thereof. The filter media comprises one or more filtering orifices that allow the free passage of the infused solution, while simultaneously preventing the passage of a significant amount of undesirable insoluble ingredient particles. In particular, for a tea beverage, the filter media is important to maintain the majority of tea solid particles coming from the leaf powder or finely cut, chiseled or crushed particles, inside the enclosure. The filter should preferably be sufficiently rigid to not deform too much under the pressure of water in the enclosure which would otherwise close the interstitial space and block the beverage upward flow. Therefore, for a paper filter, the G.S.M (grams per square meter) of the filter should be preferably above 10 g/m$^2$, even more preferably above 15 g/m$^2$. Also, the pressure in the enclosure should remain low and therefore the fluid permeability of the filter should so be sufficient to let beverage traverse slowly the filter without offering too much resistance. For this, its permeability can be defined by an air permeability of the filter that should preferably be higher than 1200 l/m², more preferably higher than 1650 l/m². The overflow wall and filtering can also be made of an integral piece. For instance, the filtering means can also be formed of a multitude of small needles protruding from the overflow wall. The interstitial space is thus formed between the needles.

In order to prevent a significant rise in pressure at the start of the brewing process, the overflow sealing wall is also preferably opened before a significant amount of fluid is introduced into the enclosure. By controlling the magnitude of the overflow aperture, the backpressure created by the overflow wall can be thus considerably reduced and the pressure rise can, be significantly eliminated at the start of the brewing cycle.

The aperture of the overflow wall can be carried out in many different ways such as by puncturing the sealing wall at the determined overflowing location or peeling off a removable membrane covering a predefined hole. However, it is preferable for essentially convenient reasons that the opening is carried out by puncturing at least one hole through said sealing wall.

The puncturing of the sealing wall can also be carried out in many different ways. One preferred example is to utilize a mechanical perforator that is part of the capsule, in which case, less interaction is produced between the beverage and the machine part which results in less cross-contamination issues and less cleaning. The mechanical perforator can be activated using an activating system of the machine (e.g., a solenoid driven pusher) or manually by the user without mechanical/hydraulic intervention of the machine.

In a possible alternative, the at least one overflow aperture can be carried out by a mechanical or a hydraulic perforator that is a part of the machine. A mechanical perforator can be one or more needles or blades. A hydraulic perforator can be one or more fluid jets of sufficient velocity to punctually perforate the overflow wall.

In another possible embodiment, the overflow wall comprises at least a pre-made overflow aperture. The overflow can be premade by construction per se of the capsule. The overflow wall can be internal to the capsule and protected by an outer closing membrane. The closing membrane can close the capsule in a gastight manner to improve the maintenance of freshness of the ingredients contained in the enclosure. The membrane can be punctured by a puncture means that is either part of the capsule or foreign to the capsule (i.e., part of the machine receiving the capsule). The membrane can be punctured for forming an outlet for the delivery of the brewed beverage out of the capsule. Preferably, the membrane is punctured wherein no significant positive pressure has been built in the enclosure.

The number of apertures in the overflow wall is not critical. In one example, the sealing or overflow wall is opened to form a single aperture through said wall for the release of the beverage through the filter and from the enclosure. The overflow aperture should leave an opening area that is large enough to enable beverage to exit at a sufficient flow rate and to not create too much backpressure so that internal pressure can stay relatively low in the enclosure.

According to another aspect of the invention, the brewed liquid is conducted downward from the overflow opening through a beverage conduit to a beverage outlet.

Therefore, the brewed liquid can be dispensed properly and hygienically into the recipient (cup, mug, . . . ) while keeping a simple capsule construction and promoting an easy handling of the capsule in the machine.

For this, the method of the invention contemplates the positioning of the capsule substantially vertically and the carrying of the beverage from the overflow opening location to the beverage outlet in a downward direction. As a result, while fluid travels substantially horizontally and upwardly in the enclosure and the interstitial space, beverage is then dispensed downwards while the capsule can be positioned vertically in the machine. This approach provides significant advantages over the existing systems that prone a horizontal arrangement of the capsule in the machine. In the present invention, not only the flow can be controlled slowlier through the capsule for a better infusion quality but the whole capsule system is greatly simplified and the handling of the capsule is easier.

Indeed, as the capsule can be placed vertically, capsule insertion and capsule removal is facilitated since the capsule can be inserted vertically from the top of the machine and it can be removed during opening of the machine along a same axis or direction by simple gravity and without need for complicated ejection devices and/or user's intervention.

In a preferred embodiment, the beverage conduit and the beverage dispense outlet are parts of the capsule and the beverage flows out of the capsule without direct contact with machine parts. This provides the additional benefits that cleaning or rinsing of the machine part is no longer required and taste cross-contamination can be so eliminated.

In another embodiment of the invention, the filtering means is a sealing wall of the capsule which is perforated by a plurality of discrete perforating members that stay in place for brewing and the overflow wall is an external wall facing the perforated sealing wall of the capsule. In other words, the filter is obtained by the conjunctions of a perforated sealing wall and discrete perforating members of the machine. When the perforating members are engaged in puncturing arrangement with the sealing wall, very small interstices are left for the brewed liquid to pass there through while the solid particles are primarily retained inside the enclosure. This arrangement has the advantage of a simpler, lower cost of capsule although more product interaction occurs between the capsule and the machine.

If necessary, an additional filter media can be used.

In an alternative, the discrete perforating members can be removed for brewing and a filter media be used inside within the enclosure.

The discrete perforating members can be needles, blades, pyramids, or other equivalent puncturing means that produces small, discrete and distributed apertures in the sealing walls.

In an embodiment, fluid can be introduced in the capsule through an entry wall of the enclosure that is opposed to the filtering wall. Again, contrary to the teaching of the prior art, fluid can be introduced on any possible side of the capsule. Preferably, the fluid is introduced from the opposed side while keeping all the benefits of the invention, i.e., slow flow for high quality infusion, controlled guidance of the beverage to the cup, reduced cross-contamination and easy handling of the capsule in the machine. This "opposed side" approach is even preferred because first it ensures that water can traverse fully though the ingredients and it also leaves more room for placing the injection fluid system on one side and it so contributes to the compactness of the capsule system (both capsule and machine).

The invention also relates to a beverage capsule system for preparing a beverage comprising:
a beverage capsule comprising an enclosure containing one or more beverage ingredients,
a brewing device comprising capsule handling members that maintain the capsule in a determined brewing position, a filtering wall is provided to filter the brewed liquid that exits the enclosure. Further, an overflow wall is placed in association with the filtering wall and the filtered liquid traversing the filtering wall is forced to pass at least one overflow aperture of the overflow wall.

Preferably, the overflow aperture is situated at least above the median horizontal plane of the enclosure. The overflow wall is configured such that at least a portion of the brewed liquid that is filtered through the filtering wall is forced to move upwardly after the filtering wall to overcome the overflow aperture. This portion of liquid is preferably the denser portion located in the enclosure.

Additional features and advantages are described herein, and will be apparent from the following Detailed Description and the figures.

BRIEF DESCRIPTION OF THE FIGURES

Embodiments of the present invention will now be described, by way of example only, with reference to the accompanying drawings, in which.

DETAILED DESCRIPTION

Figure 1:
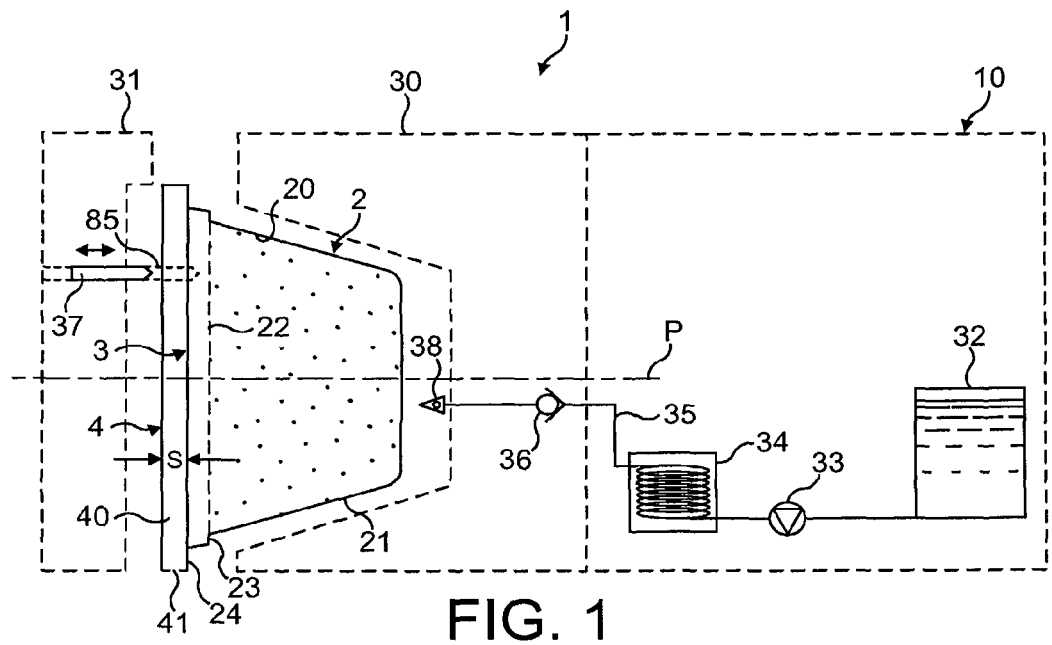
FIG. 1 is a schematic illustration of a brewing capsule system for carrying out the method of the invention according to a first embodiment.

The general principle of the method of the invention will now be explained in relation to FIGS. 1 and 2 in a first possible mode and in relation to FIGS. 3 and 4 in a second possible mode.

In the first mode, a capsule system 1 is provided that comprises a capsule 2 and a beverage brewing device 10. For simplicity, the beverage brewing device is only schematically depicted and may, in reality, comprise additional technical features within the normal knowledge of the skilled person of the art. The capsule comprises an enclosure 20 containing beverage ingredients such as leaf tea and the like. The enclosure is demarcated by a cup-shaped housing 21 and a filtering wall 22 that is fixedly attached to peripheral inner step 23 of the housing 21. The housing may encompass different cross sections such as a circular, ellipsoid, square, rectangular or polygonal section that determine as a matter of fact the general profile of the filtering wall 22. The enclosure is sized to accommodate a dose of leaf beverage ingredient of typically about between 5 to 10 grams, preferably 2 to 5 grams. The dose of leaf ingredient may depend on the final volume of beverage to produce. For an individual cup of tea, a typical dose can be of about 2 grams whereas for a tea pot, a typical dose can be of about 8 to 10 grams. As clearly apparent in FIG. 1, the capsule is positioned relative to the brewing device 10 so that the filtering wall 22 extends substantially vertical and from substantially the bottom of the enclosure. For this, the capsule is preferably positioned in a "vertical" arrangement in the brewing device 10. The cup-shaped housing 21 can be so oriented with its large opening and its bottom oriented in a vertical position.

The capsule is preferably closed by a sealing wall 3 that hermetically closes the enclosure 20. The sealing wall is attached, for instance, to a peripheral outer rim 24 of the cup-shaped housing.

Both the sealing wall and the housing can be made of oxygen barrier materials and the enclosure can be substantially free of oxygen so that the freshness of the beverage ingredients can be preserved during an extended period of time. The sealing wall can be a flexible membrane or a semi-rigid plastic part. A puncturable sealing membrane is preferred such as a monolayer or a multi-layer membrane, typically, laminates of PET/Aluminium/PP, PE/EVOH/PP, PET/Metallised/PP, Aluminium/PP.

The enclosure is preferably oxygen free and may contain flushed inert gas such as N2, N2O or CO2.

The capsule can further comprise a cover member 4 that is also attached to the rim 24 of the housing and overlaps the sealing wall 3. The cover forms an internal channel 40 that terminates at its side end by an outlet 41.

The shape of the capsule is not very critical. Preference is given to a trunconical, ellipsoidal or hemispherical shapes for different reasons. This allows a larger surface for the exit of the beverage through the sealing wall when perforated and a reduction of the inside pressure. The housing can also be manufactured industrially at lower cost by plastic thermoforming or aluminium or aluminium-plastic deep drawing. This shape with smoother corners also favours the removal of the handling members and so the ejection of the capsule.

Turning to the brewing device 10, it comprises capsule handling members 30, 31 that are configured to hold the capsule in the "vertical" arrangement as defined. These handling members 30, 31 can be machine jaws or any suitable mechanical enclosing means that can open and close about the capsule and can maintain it firmly in place. There is no need for providing high closing forces since the involved fluid pressure in the capsule remains relatively low and, preferably, as close as possible to the atmospheric pressure. Also, since the capsule can withstand the low brewing pressure therefore the capsule does not necessarily need to be entirely enclosed but simply held water tightly in place during brewing. This participates to a simplification of the machine and reduce machine costs.

The brewing device comprises a water supply 32, such as a water tank, a water pump 33, a heater 34 and a hot water injection line 35 that is managed through the handling member 30. The brewing device may also comprise a controller and a user interface board (not shown) to manage the beverage preparation cycles as known in the art. A backpressure valve 36 can be provided to lower the pressure at the entry side or injection member 38 (such as a needle(s) or blade(s) and a water inlet) in the capsule. Of course, the backpressure valve could be omitted and a low pressure pump could be used that delivers fluid at low pressure. Medium to high pressure pump may however be preferred because of their robustness and reliability and so used in combination with a backpressure valve.

The brewing device may further comprise a means 37 for perforating the sealing wall at an overflow location of the enclosure. As shown in FIG. 1, the perforating means 37 can be activated after closing of the handling members 30, 31 about the capsule. The perforating means is forced through the cover 4 and sealing wall 3 to create an overflow aperture 25 and then is retracted away from the aperture 25 to leave the aperture fully open.

Figure 2:
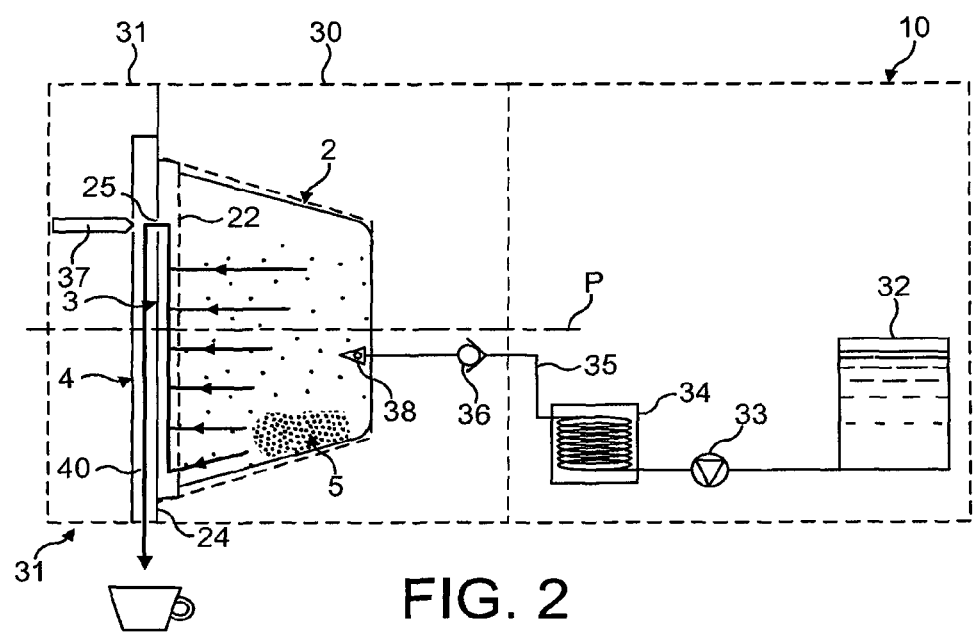
FIG. 2 is a schematic illustration of a the brewing system of FIG. 1 during brewing of the capsule.

Importantly, in the brewing operation shown in FIG. 2, the capsule finally comprises an overflow wall 3 with an overflow aperture 25 placed at least above the median horizontal plane P of the enclosure. As also apparent in FIG. 2, the filtering wall 22 and the overflow wall 3 are spaced apart a short distance sufficient to create an interstitial space "s" that is supposed, without being bound by theory, to work as a sort of "siphon" that can promote the upward motion of the denser beverage portion that is predominantly localized in the bottom of the enclosure.

In relation to FIG. 2, the method of the invention works as follows. A capsule is inserted in the brewing device and the capsule handling members are closed about the capsule to position it with the sealing wall being substantially vertically oriented. An overflow aperture 25 is created by the perforating means 37 that punctures the sealing wall 3 and is withdrawn to leave the aperture opened. On the opposite side of the capsule, the fluid injection member is introduced in the capsule's enclosure. Hot water is thus injected in the capsule at relatively low pressure, preferably, at a pressure not exceeding 0.2 bar. Hot water slowly fills the capsule in and submerges the beverage ingredients in the enclosure. The brewed beverage is filtered through the filtering wall 22. A denser portion 5 of the beverage may tend to settle in the bottom of the enclosure; which portion is also filtered through the filtering wall since the filtering wall is properly placed adjacent this portion. The denser beverage is evacuated through the interstitial space "s" as caused by the variation of pressure between the lower part of the space and the upper part of said space therefore acting similarly to a "siphon". The rest of the beverage is also filtered also by passing through the filtering wall at different vertical levels up to the upper level of the fluid in the enclosure and is evacuated to the overflow aperture 25.

It should be noted that the overflow aperture should preferably be placed above the ¾ of the total height of the enclosure and even preferably be placed above the ⅘ of the total height of the enclosure; thus ensuring a more complete submergence of the beverage ingredients and a slower evacuation of the beverage from the enclosure which favours a better infusion process.

The "total height" of the enclosure is meant to be the total distance separating the lowermost point of the enclosure to the uppermost point of the enclosure when the capsule is positioned in the beverage machine ready for the brewing operation. In a mode, the filtering wall is substantially equal to the total height of the enclosure.

It can be noted that a "direct flow" can be obtained where the brewed liquid is dispensed directly into the recipient 6 (e.g., cup, mug and the like). By "direct flow", it is meant that the outlet is arranged in respect to the brewing device so that the brewed liquid does not encounter any permanent device part when leaving the outlet. In other words, the outlet is placed sufficiently low and laterally spaced from the capsule handling members to avoid any significant contact of the liquid with these members when released.

The principle of the brewing method according to FIGS. 1 and 2 encompasses different variants and equivalences.

For instance, the overflow wall 3 may not be perforated but may be pre-opened by a pre-cut overflow aperture. The pre-cut overflow aperture means an aperture which has already been made at the manufacturing stage of the capsule. Freshness of the beverage ingredients may so be preserved by different means such as by an airtight closed cover with a sealed outlet that is unsealed just before brewing or by the use of an airtight over wrap package that encloses the capsule.

The capsule may also be conceived without the cover 4 and its channeling function. In which case, the front handling member 31 may be designed to collect the brewed liquid as it passes the overflow wall 3 and travels down to the recipient.

Figure 3:
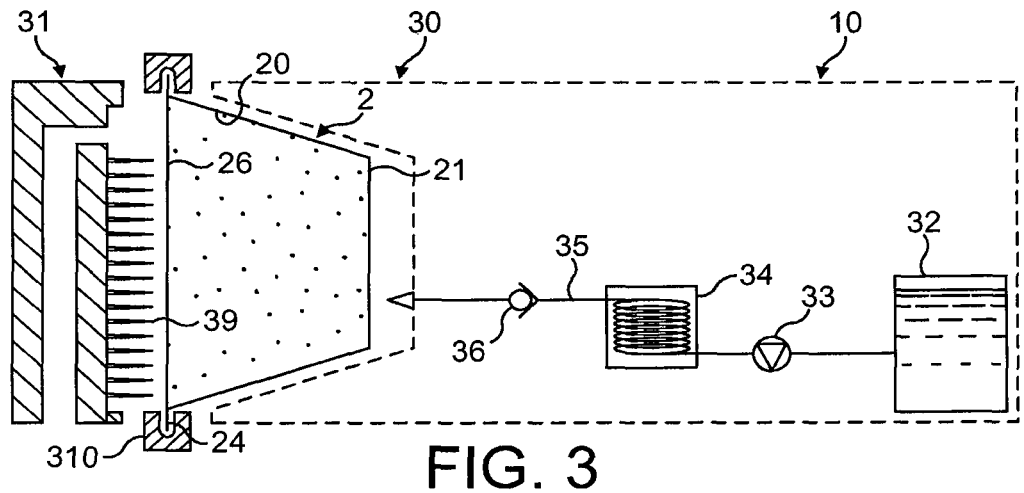
FIG. 3 is a schematic illustration of a brewing capsule system for carrying out the method of the invention according to a second embodiment.
Figure 4:
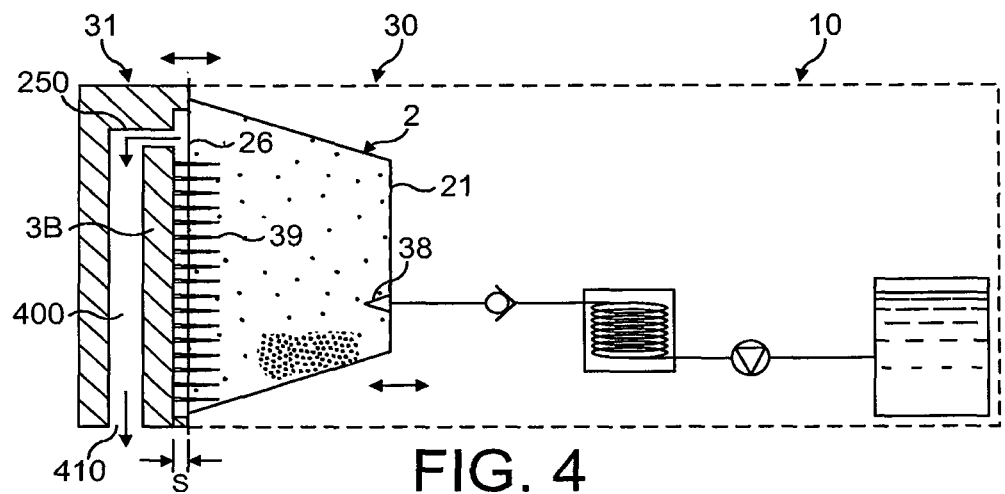
FIG. 4 is a schematic illustration of a the brewing system of FIG. 3 during brewing of the capsule.
Figure 5:
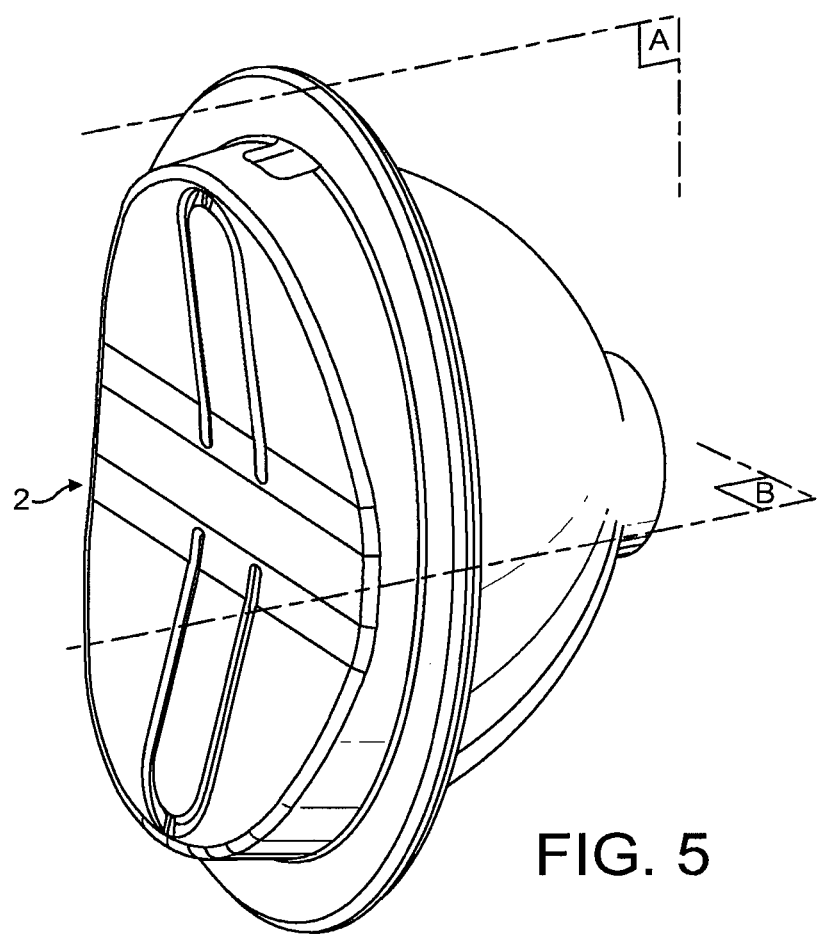
FIG. 5 illustrates a perspective view of a capsule according to a third embodiment of the invention.
Figure 6:
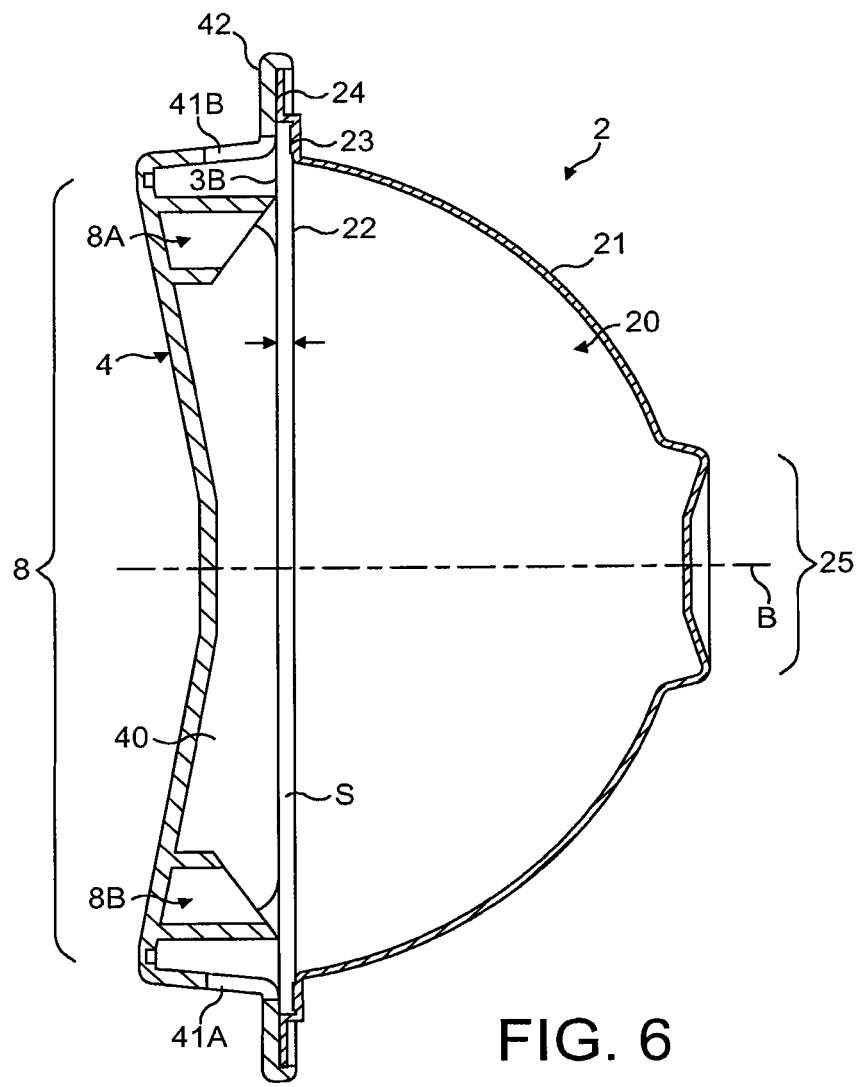
FIG. 6 is a cross-sectional view of the capsule of FIG. 5 along median vertical plane A.

Another significantly different variant of the invention is described in relation to FIGS. 3 and 4. For the sake of simplicity, the same numerical references are here utilized to refer to the same technical means or features as in the embodiment of FIGS. 1 and 2. This variant differs in that the capsule does not longer bear the overflow wall and the beverage channel and outlet which are part of the brewing machine. This results in a much simpler, lower cost capsule and a more complex brewing device but may be regarded as equivalent as far as the general brewing principle is concerned.

The capsule can thus comprise an enclosure demarcated by a cup-shaped housing 21 and a sealing wall 26 sealingly attached to the housing, for example, along peripheral sealing edges 24. The sealing wall 26 is a flexible puncturable membrane that imperviously closes the housing. The enclosure is preferably oxygen free and may contain flushed inert gas such as $N_2$, $N_2O$ or $CO_2$.

The overflow wall is here a part of the brewing device and illustrated as reference 3B. On the surface of it, facing the sealing wall of the capsule is provided a plurality of puncturing members 39. These puncturing members are preferably distributed across a surface that substantially covers at least ¾ of the surface of the sealing wall, and preferably over about 80% to 100% of the surface of the sealing wall. More importantly, the puncturing members should extend vertically from the vicinity of the bottom of the enclosure to enable evacuation of the denser portion of the brewed liquid that settles in the bottom of the enclosure.

As illustrated in FIG. 3, the method can start with the capsule being placed between the two capsule handling members 30, 31 of the brewing device with the puncturing members 39 being sufficiently away from the sealing surface to allow an easy capsule insertion in the device. The capsule can be maintained in place before closing of the device by any suitable holding system 310 engaging its peripheral edge 24 as schematically illustrated.

For brewing the capsule, the brewing device is closed about the capsule which causes the puncture members 39 to puncture the sealing wall 26 of the capsule. The combination of the puncturing elements 39 and the sealing wall in the puncturing arrangement can form a filtering means sufficient to filter the brewed liquid that leaves the enclosure.

The puncturing elements can be selected in number, shape and size such that the filtering is effective enough to remove the turbidity of the brewed liquid that is released. These characteristics of the puncturing elements are also chosen so as to not create too much backpressure that could force pressure to rise inside the enclosure and negatively affects the quality of the beverage. In a preferred example, the number of puncturing elements is from 10 to 100, preferably between 20 to 40. The puncturing cross section of the elements can vary from 0.01 to 2 mm, preferably, of from 0.1 to 1 mm. The shape may be conical, cylindrical, square, star-shaped, pyramidal, etc.

The brewed liquid can therefore be filtered between the orifices created by the puncturing members and the surfaces of said members and be so released in an interstitial space "s" provided between the punctured sealing wall 26 and the overflow wall 3B of the brewing device facing the sealing wall 26. The interstitial space can be produced by puncturing the wall 26 over a limited length of the puncturing members 39 and providing a stepwise arrangement of the capsule handling members and/or an abutment means placed there between. The brewed liquid can be so collected in the space through the sealing wall at different vertical levels of the enclosure depending on the specific density of the brewed layers and be evacuated through the space and to an overflow aperture 250 belonging to the front capsule handling member 31. The brewed liquid is then guided downwardly in a beverage flow channel 400 to a beverage outlet 410 and can so be gently dispensed as a directed flow of beverage to the cup.

Another embodiment of the invention is illustrated in relation to FIGS. 5 to 10. These figures illustrate a variant of the beverage capsule 2 for carrying out the method of the invention.

The beverage capsule 2 comprises an enclosure 20 for containing one or more beverage ingredients. The enclosure 20 is defined by the assembly of a cup-shaped shell 21 and a filtering wall 22. A sealing exit wall 3B closes the shell 21 hermetically and will serve the purpose of the overflow wall as will be explained later on. The capsule further comprises a cover or lid 4 with a peripheral rim that is attached to the peripheral rim 42 of the housing 21. The connection between the lid and housing can be made by gluing, welding, snap fitting and any combinations thereof.

The exit sealing wall 3B may be constructed of a rigid, semi-rigid, or non-rigid material, or combinations thereof. Suitable materials include, but are not limited to, plastics, PET, aluminium foil, polymeric film, paper, and the like. In a preferred mode, the wall is a flexible membrane made of monolayer or laminate with a gas barrier and oxygen is substantially removed from the enclosure during manufacturing by inert gas flushing or a similar technique, therefore, to maintain freshness of the beverage ingredients before use.

The lid serves as a support for at least one puncture means or puncture indication means 8. Indeed, the capsule comprises at least one puncture means 8 positioned relatively to the sealing wall 3B to be able to produce at least one overflow aperture in the sealing wall. In the preferred example shown here, the capsule comprises two puncture means 8A, 8B. The need for two puncture means on the capsule will become apparent in the following description, but in simple terms, it enables to use the capsule in different orientations in the brewing machine and so provide more convenience to the user in the handling of the capsule.

The puncture means are positioned in an off-centered arrangement relative to the median plane B representing the horizontal plane passing by the centre of the enclosure 20 when the capsule is placed in operation in the brewing device 10.

In this preferred mode, the capsule comprises two series (respectively referenced "A" and "B") of one puncture means 8A, 8B and of one beverage outlet 41A, 41B; each series being placed offset relative to the median centre plane B of the sealing exit wall and opposed to each other. In particular, the two series 8A, 41A; 8B, 41B of said puncture means and said outlets, are placed symmetrically with respect to a median plane passing through the centre plane of the sealing exit wall.

The main advantage of such configuration is that the capsule can be so oriented in two possible orientations, at about 180° one another, thus facilitating insertion and placing of the capsule in the machine. Of course the number of series could exceed two, preferably an even number such for instance four series which are grouped by two at 90° degrees from each other, so that it offers four different possible orientations in the machine.

The capsule further comprises a filtering wall 22 that is spaced apart a short distance relative to the sealing wall in order to leave an interstitial space "s" there between. The filter wall can be attached by any suitable connection means, such as welding, gluing, snap fitting or any equivalents, to a peripheral stepped portion 23 of the housing. The filter media can be constructed from a variety of materials including, but not limited to, plastic, foil, non-woven polyester, polypropylene, polyethylene, paper materials, and combinations thereof.

The beverage flow conducting means 40 can preferably be positioned adjacent and outside relative to the sealing exit wall. As a result, the capsule can be oriented vertically, e.g., its exit wall being vertically oriented, in order for the flow to be directed straight down to the cup via the beverage flow conducting means and the beverage outlet. One additional advantage is that the capsule can be "direct flow" in the sense that the beverage that leaves the machine falls down directly into the cup without touching a part of the machine. The benefits are so less taste cross-contamination and reduced cleaning.

According to an aspect of the invention, the puncture means 8A, 8B and the beverage outlets 41A, 41B are respectively placed at two opposite off-centered sites relative to the centre or plane B of the sealing exit wall or enclosure. By the fact that the beverage leaves the enclosure at approximately the highest point and leaves the beverage outlet at approximately the lowest opposite point of the capsule, the combined advantage is that the capsule can both be held in a vertical orientation for an improved brewing and can produce a "direct flow" of the beverage into the cup.

Preferably, one of the beverage outlets 8A, 8B, depending on the capsule's orientation in the brewing device, becomes so oriented downwards to release the beverage in a direction that is substantially orthogonal to the direction at which the beverage is released out of the overflow location. This configuration enables to orient the capsule in the machine such that the beverage is released in a straight downward direction into the cup thus favouring a "direct flow" without contact with the machine.

In a preferred mode, the flow conducting means 40 is shared by the two series A, B at once. As a result, the construction of the capsule is rationalized and less costly to produce.

Figure 7:
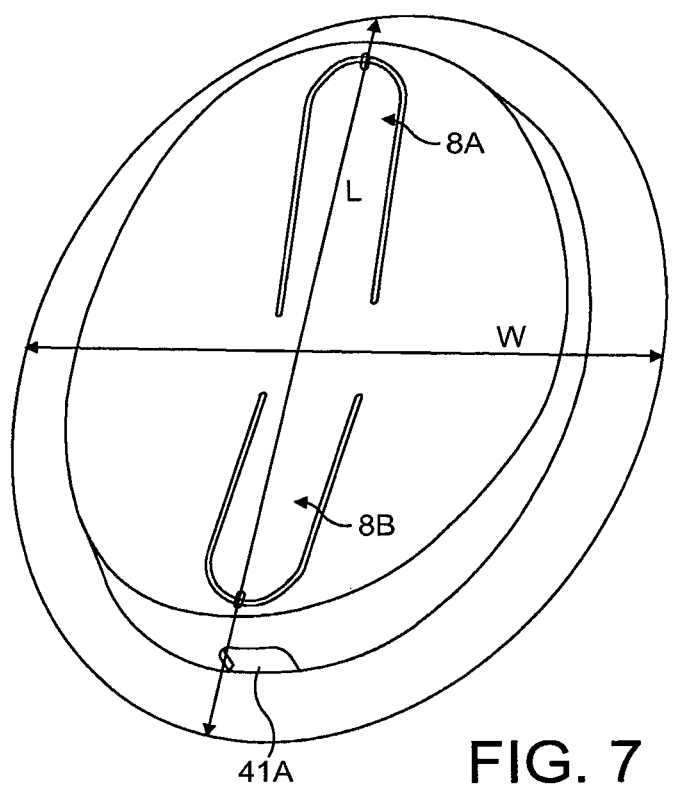
FIG. 7 is a perspective external view of the cover or lid of the capsule of FIG. 5.
Figure 9:
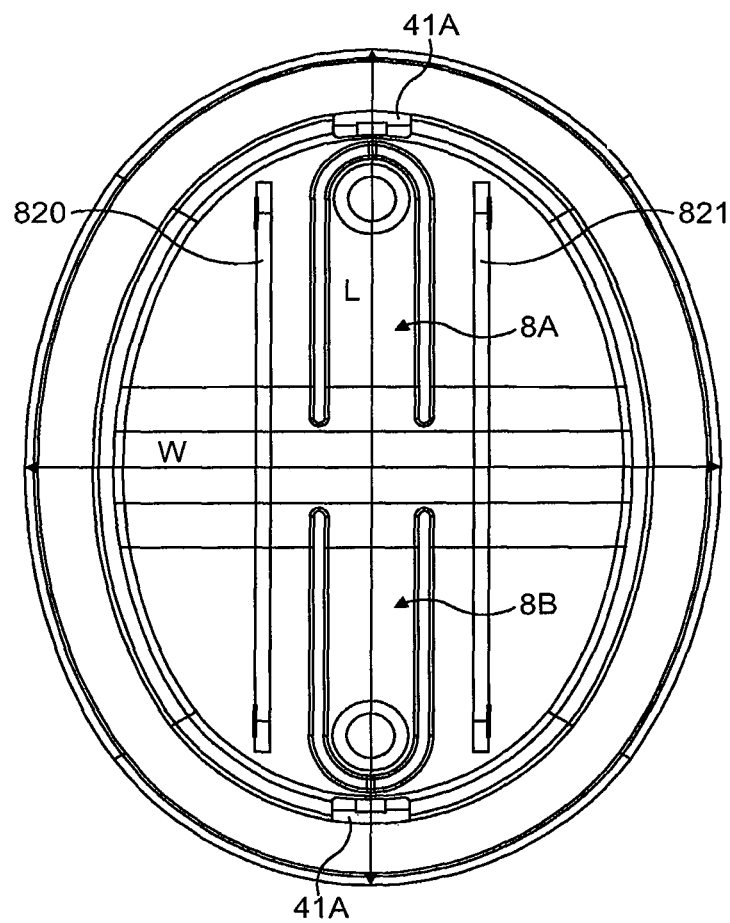
FIG. 9 is a plane internal view of the cover or lid of FIG. 5.

As more particularly shown in FIG. 7 or 9, the capsule can also be shaped to promote and indicate to the user a particular direction for insertion into the brewing device. For instance, the capsule can be provided with an elongated shape having an axial distance L and a shorter transversal distance W; wherein the at least one puncture means 8A, 8B and at least one outlet 41A, 41B are placed substantially along the axial distance.

Figure 8:
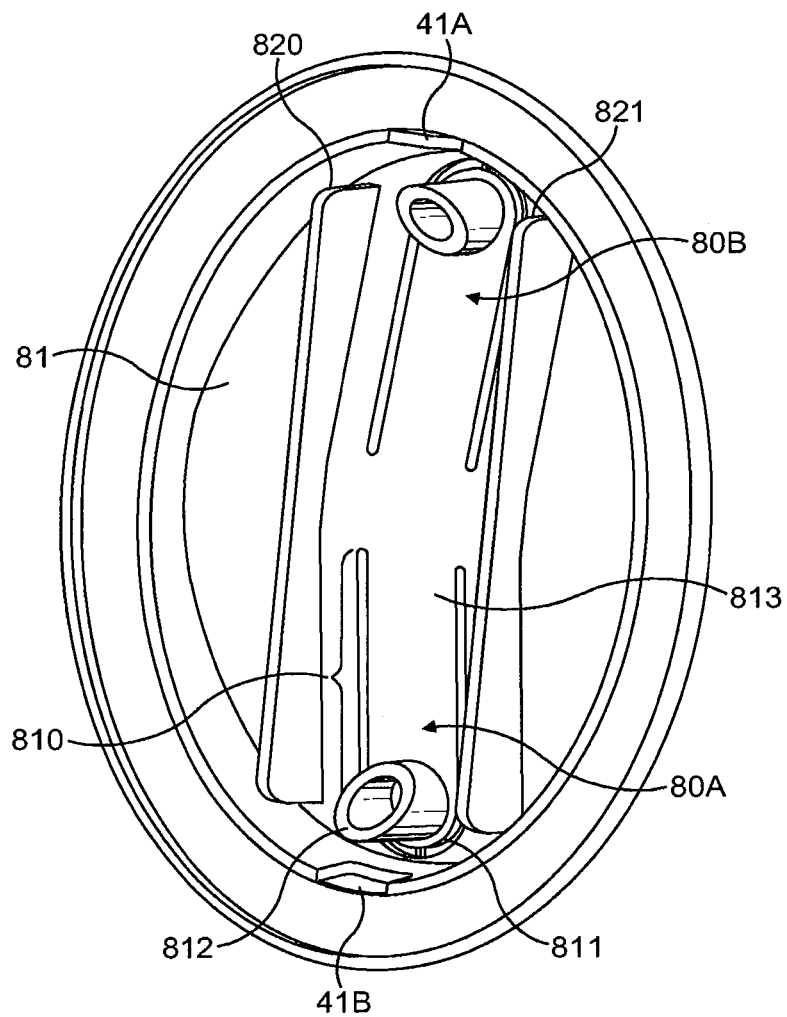
FIG. 8 is a perspective internal view of the cover or lid of the capsule of FIG. 5.

The puncture means 8A, 8B comprises two spring-biased mechanical perforating members that are better shown in FIGS. 8 and 9. Each member is formed of one resilient plastic tongue 810 made integral with the rest of the lid. The tongue supports at its flexure end 811 an inner spike 812 sufficiently large to create an overflow aperture of sufficient section in the sealing wall. At its attached end 813, the tongue connects integrally to the surface of the transversal surface of the lid. The two puncture means and outlets are thus aligned along the longer axis of the lid.

In the inner recess 81 of the lid, internal portions of wall 820, 821 are provided that run parallel to each other and on each side of the puncture means. The portion of wall 820 extends inwardly and perpendicularly to the recess 81 and comes proximate to the sealing wall 3B. They also preferably run from a point proximate to the two outlets 41A, 41B in order to form the inner channel 40 capable of guiding the flow of brewed liquid from the overflow aperture to its respective outlet placed opposite on the lid.

Figure 10:
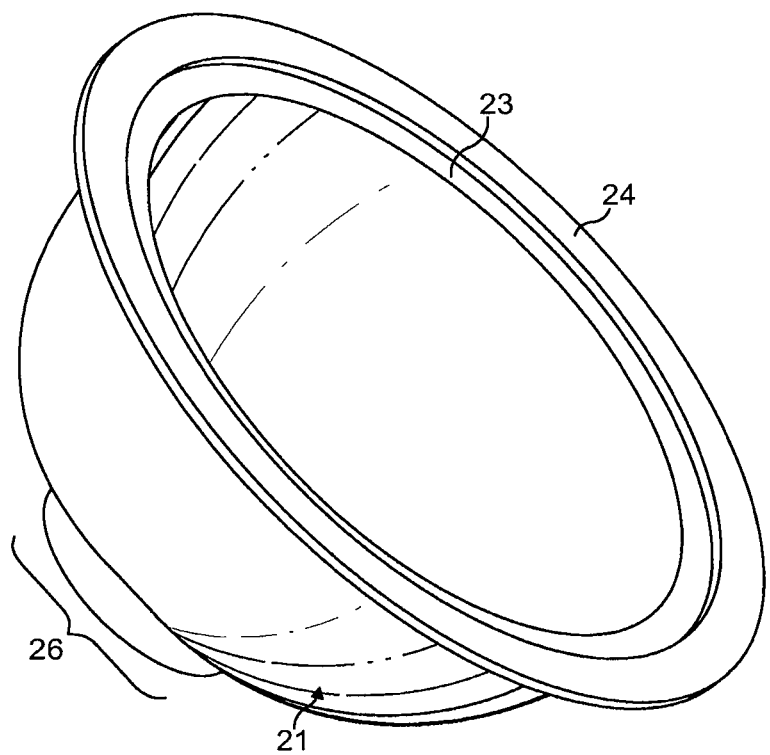
FIG. 10 is a perspective view of the cup-shaped housing of the capsule of FIG. 5.

FIG. 10 shows the capsule housing or shell 21. In particular, the housing can be formed of thermoformed; blow moulded or injected in plastic such as PP or a PP laminate comprising an oxygen barrier or any suitable food grade polymer or of deep drawn aluminium or aluminium-polymer laminate. The housing has a peripheral rim 24 that extends as a flange to constitute a substantially flat sealing portion onto which can be sealed the sealing wall and snap fitted and/or sealed the cover 4. A small step 23 is conceived radially inward to the rim forming a step to receive the filter wall that can be sealed or otherwise connected to the flat radial portion of the step. The depth of the step depends on the thickness of the filter wall and on the control of the interstitial space to provide the siphon effect. For instance, the filter wall can range from 0.1 to 1.5 mm whereas the depth of step ranges of from 0.2 to 5 mm whereas the interstitial space ranges of from 0.1 to 3.5 mm.

At the rear of the housing, the wall of the housing can comprise a raising zone 26 that constitutes the injection region for the introduction of the fluid in the capsule. The raising zone is so conceived to resist to compressive forces of the injection device 38 and to puncture at its centre more easily.

It can be noted that the puncture means could be replaced by mere puncture indication means, for instance, at least one hole provided through the lid that is placed strategically to guide an external perforator of the brewing device in a way similar to the embodiment of FIG. 1.

FIGS. 11 to 14 refer to the brewing process and related machine system of the capsule of FIGS. 5 to 10. The advantages of the "vertical" arrangement of the capsule in the brewing device become even more apparent in relation to these figures in relation to the convenience in the handling of the capsule from insertion to removal.

Figure 11:
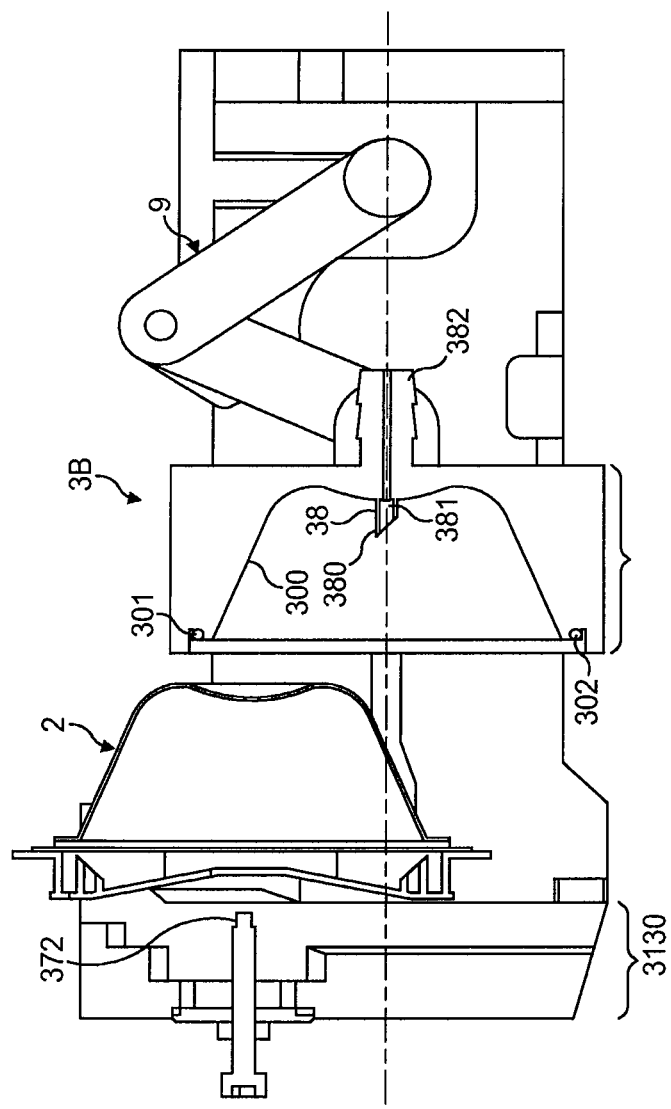
FIG. 11 shows the phase of insertion of the capsule of FIGS. 5 to 10 in the brewing device.
Figure 14:
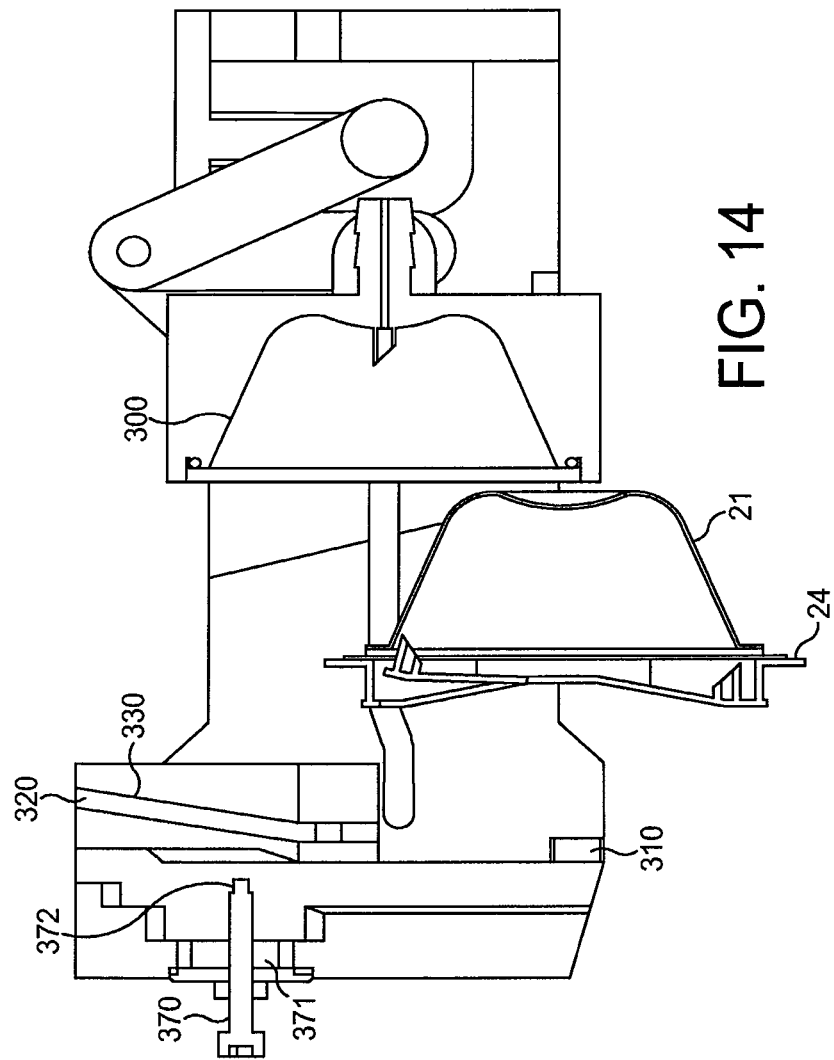
FIG. 14 shows the phase of removal of the capsule from the brewing device.

An exemplary of a brewing module will now be depicted in more details in relation to FIGS. 11 and 14 that represent respectively the insertion and ejection modes of the capsule. The brewing module 3B comprises two main capsule handling members 30, 31 that cooperate in engagement to close about the capsule 2 of FIG. 5. A front handling member 31 can be fixed relative to the brewing device (not entirely depicted) whereas rear handling member 30 is mobile relative to member 31. One can note that this could be the opposite; the front member could be mobile and the rear member fixed or both could be mobile. The front handling member has guiding insertion means 320 that enable to insert the capsule in the brewing device. Means 320 can be a lateral member comprising two lateral slots 320 placed on each side of the capsule to engage the rim 24 of the capsule. The slot can be slightly slanted toward the front handling member in a manner to progressively bring the capsule near the front handling member as capsule progressively falls down by gravity in the device. A retaining means 310 is provided at the lower part of the handling member for the capsule to be retained in place once inserted in. A lower portion of the rim 24 of the capsule thus engages an abutting portion of means 310.

In the front handling member is provided a mechanical pusher 370 that is slidably mounted through a bearing portion 371 of the handling member. The mechanical pusher can be associated to an actuating means such as electromechanical solenoid, a cam or any equivalent means (not shown) that can move the mechanical pusher back and forth through the bearing portion. The mechanical pusher is so moveable in two positions; a first retracted position of FIG. 11 in which the free end 372 of the pusher is kept away from the capsule when placed in the device and a second extended position shown by FIG. 13 in which the pusher actually engages the upper puncture means 8.

The rear handling member 30 comprises a housing 300 having a shape that is substantially complementary to the shell 21 of the capsule. The housing includes at its bottom end a fluid injection member 38 that can be, for instance, a sharp needle 380 traversed by a fluid conduit 381. At the rear of the rear handling member is located a gland that is connected to a fluid tubing (not shown) linked to the fluid system of the beverage device. The housing 300 has at its open end a small peripheral recess 301 in which is lodged an annular seal joint 302 that makes the fluid tightness against the back of the stepped rim 24 of the capsule when closing is carried out.

The rear handling member 30 can be moved along a substantially horizontal path by means of a toggle lever system 9 that is not going to be described in detail here since many different mechanical or hydraulically assisted closing means can be envisaged by a man skilled in the art to move the handling member in a closing arrangement about the capsule in conjunction with the front handling member.

Figure 12:
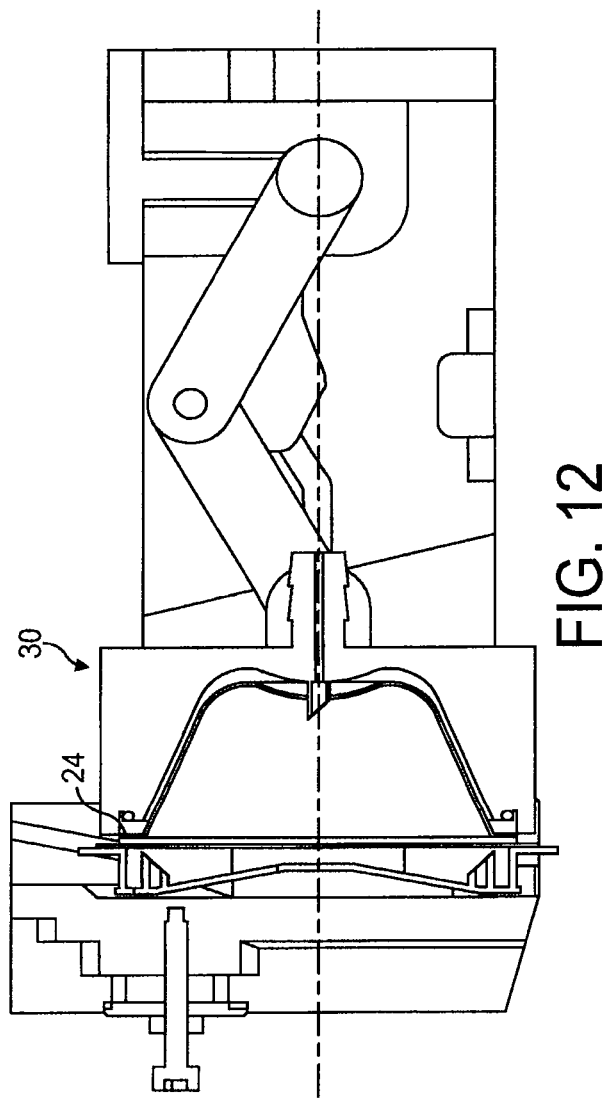
FIG. 12 shows the phase of closing of the brewing device about the capsule.

FIG. 12 shows the rear handling member 30 being displaced by the toggle lever system 9 that extends toward a close position of the brewing device and the rear of the capsule being pierced by injection member 38.

Figure 13:
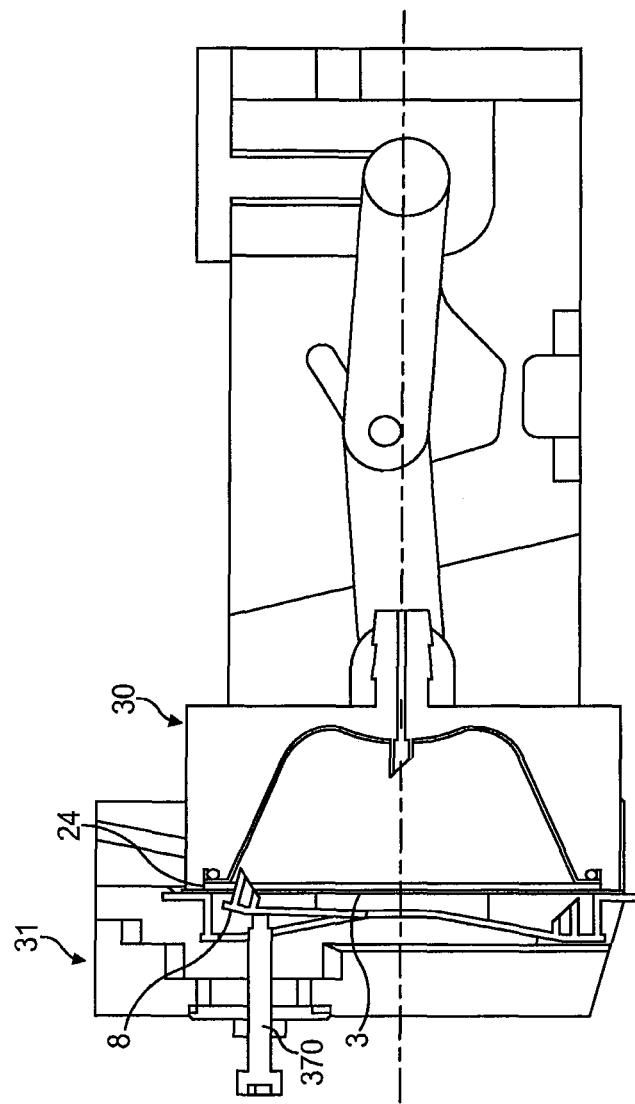
FIG. 13 shows the phase of creating the overflow aperture of the capsule before brewing in the brewing device.

In FIG. 13, when the handling members 30, 31 have been closed about the capsule and the capsule is tightly secured along its stepped rim 24, the mechanical pusher 370 is activated in the deployed position to push the upper puncture means 8 against the sealing wall 3 of the capsule. This results in the sealing wall being locally punctured with an overflow aperture. The mechanical pusher is then moved to its retracted position thus leaving the aperture fully disengaged. In the next step, the brewing can start and fluid can be injected in the capsule for brewing the ingredients as already explained.

In FIG. 14, the handling members open, i.e., the rear handling member is retracted, which causes the capsule to be slightly pulled back and thus it can fall down by gravity and be discarded.

Figure 15:
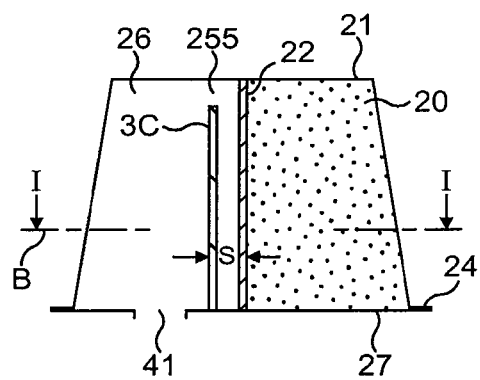
FIG. 15 shows a cross section view of a trunconical capsule according to a fourth embodiment of the invention.
Figure 16:
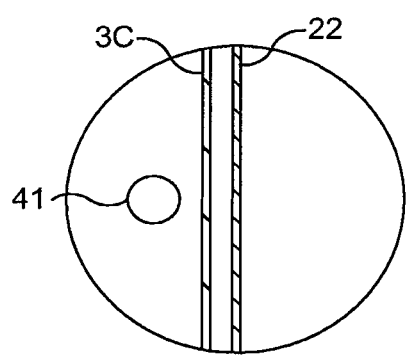
FIG. 16 shows a cross sectional view in direction I-I of median plane B of the capsule of FIG. 15.

FIGS. 15 and 16 illustrate another variant of the capsule of the invention that is conceived to be brewed while being positioned "horizontally" in the brewing machine. The general brewing principle remains the same as in the preceding examples. The capsule comprises an enclosure 20 containing the one or more ingredients to be brewed. The enclosure is demarcated by the trunconical shell 21, a lower wall 27 and an inner filter wall 22. The filter wall transversally splits the inner volume of the shell in two parts; the enclosure and a second beverage collecting volume 26. The filter wall is placed so that it runs from the two top/bottom ends of the enclosure so that the denser liquid that tends to stay near the bottom can be removed through the filter. The lower wall 27 can be a circular portion that is attached to the rim 24 of the shell 21 such as by crimping, welding, gluing or combinations thereof. It comprises an overflow wall 3C that rises upwardly inside the shell in front of the filter and leaves an overflow aperture 255 in a region close to upper bottom/wall of the shell 21. The overflow wall is spaced at short distance "s" from the filter wall 22. A beverage outlet 41 is provided in the collect chamber 26 and through the bottom wall 27. The beverage capsule of FIGS. 15 and 16 is brewed in a "horizontal" orientation, i.e., with the bottom wall and outlet 41 facing downwardly. Water is injected at low pressure in the enclosure, preferably from the bottom wall. The brewed liquid flows through the filter wall 22 and is forced to pass the overflow aperture 3C to the collect chamber 26 then down to the outlet 41.

Figure 17:
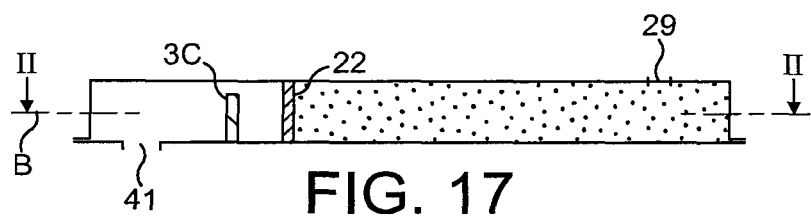
FIG. 17 shows a cross sectional view of a rectangular capsule according to a fifth embodiment of the invention.
Figure 18:
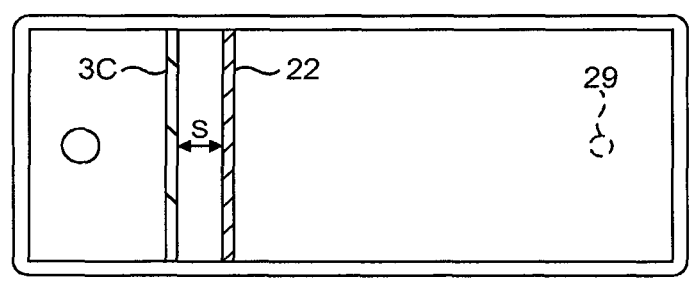
FIG. 18 shows a cross sectional view in direction II-II of median plane B of the capsule of FIG. 17.

FIGS. 17 and 18 illustrate another variant of the capsule that is designed to be brewed according to the method of the invention. The capsule possesses the same features as the capsule of FIGS. 15 and 16 except that it is of a rectangular shape. The capsule also comprises an injection point 29 that can be a pre-scored or weakened portion for the introduction of a water nozzle of the brewing device. The weakened zone can be a plastic part that breaks when forced by the nozzle's introduced therein.

Figure 19:
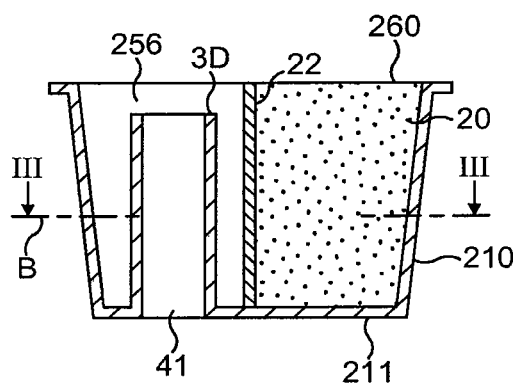
FIG. 19 shows a cross sectional view of a capsule according to a sixth embodiment.
Figure 20:
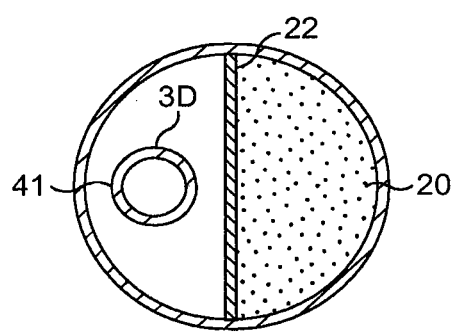
FIG. 20 shows a cross sectional view in the direction of median plane B of the capsule of FIG. 19.

FIGS. 19 and 20 illustrate another possible embodiment of capsule that is designed to be brewed according to the general principle of the invention. In this embodiment, the overflow wall is a funnel 3D that prolongs the outlet 41 inside the capsule. The funnel remains short enough to leave an upper gap 256 between the end section of the funnel and the upper surface of the capsule to constitute the overflow aperture. It can be noted that the supporting structure of the capsule can encompass many variants such as the one illustrated in this example. Here, the capsule has an inverted U-shaped shell 210 with its bottom wall 211 forming the bottom of the capsule; and is closed by a cover 260. The shell is delimited in two volumes by a planar vertically oriented filtering wall 22. The injection of water in the enclosure 20 that contains the ingredient can be carried out either through the cover 260 in which case the cover is preferably a puncturable membrane or through the shell 210 (i.e., in the side or bottom).

Figure 21:
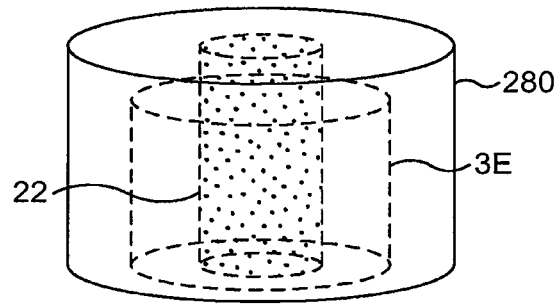
FIG. 21 shows a schematic perspective view of the principle capsule according to a seventh embodiment.
Figure 22:
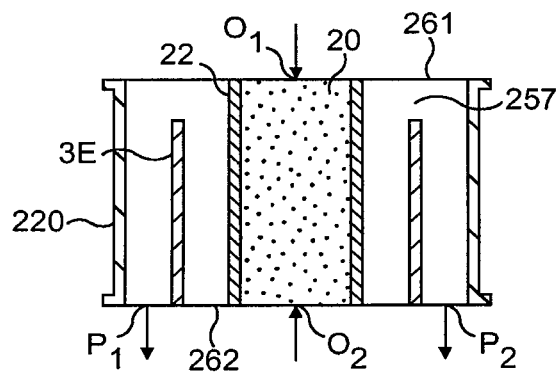
FIG. 22 is a cross sectional view of the capsule of FIG. 21.

FIGS. 21 and 22 illustrate another variant in which the capsule is made of concentric tubular elements of progressively decreasing diameters (i.e., respectively, from a first to a third portion). The outer body or housing of the capsule is made of a first tubular body 220. The overflow wall is made of a second tubular portion 3E of smaller diameter and smaller height. The filtering member 22 is made of a third tubular portion of smaller diameter and substantially equal height as the outer body. This third tubular portion can be, for instance, a spongy or paper or woven, or nonwoven or sintered plastic tube or a combination thereof. The beverage ingredient fills the interior of the third tubular portion that so constitutes the enclosure 20. The outer body can be sealed on its upper and lower sides by respectively upper and lower lids 261, 262. Owing to the smaller height of the second tubular body, an overflow aperture 257 is performed that can let brewed liquid pass after it has been filtered through the filtering tubular portion 22. Of course, the lower lid 262 can be made integral with the overflow wall such as in injected plastic. The lower lid, overflow wall and first portion could be made of an integrally moulded plastic as well. The first portion could have a non-tubular shape as well. The points O1, O2 represent the possible water introduction sites in the capsule. As it shows, the water can be introduced at the upper or lower centre of the capsule through the upper or lower lid straight in the enclosure. The points P1 P2 represent the possible exit point for the brewed beverage. The beverage can possibly be dispensed from the capsule along any suitable location between the first and second tubular portions through the lower lid 262.

Figure 23:
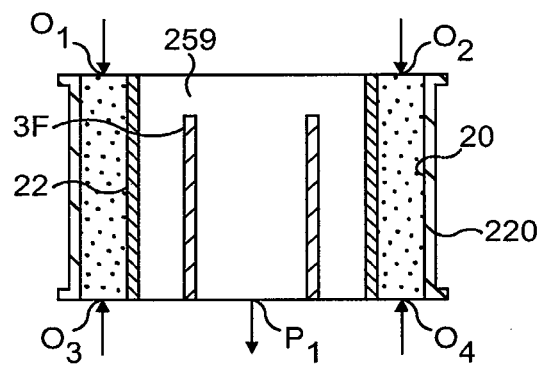
FIG. 23 is a cross sectional view of a variant of the capsule of FIG. 22.

FIG. 23 illustrates another variant of a concentric arrangement of tubular portions of progressively decreasing diameters (i.e., respectively, from a first to a third portion) that differs slightly from the previous in that the enclosure 20 is provided at the outermost annular volume between a first outer portion 220 and a second filter tubular portion 22. In this embodiment, a third portion 3F of tube of smaller diameter and smaller height is placed at the centre to force overflow of the brewed beverage. Points O1, O2, O3, O4 represents the possible inlet fluid sites. Point P1 represents the possible beverage outlet site.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A beverage brewing apparatus for preparing a beverage, the apparatus comprising:
   a beverage capsule comprising an enclosure containing one or more beverage ingredients and a filtering wall to filter the brewed liquid that exits the enclosure, and
   a brewing device comprising capsule handling members that maintain the capsule in a determined brewing position that is vertical such that fluid is injected into the capsule through a lateral wall of the enclosure,
   wherein the vertical brewing position of the capsule positions the filtering wall vertically, and
   an overflow wall is positioned within the capsule in parallel association with the filtering wall and a filtered liquid traversing the filtering wall is forced to pass at least one overflow aperture of the overflow wall.

2. The beverage capsule apparatus of claim 1 wherein the overflow wall is positioned at a front end of the enclosure, and the lateral wall through which the fluid is injected is positioned at a rear end of the enclosure and opposite to the overflow wall, the filtering wall extending parallel to the overflow wall and the lateral wall through which the fluid is injected.

3. The beverage capsule apparatus of claim 1 wherein the brewing device comprises a perforating member that forms the at least one overflow aperture in the overflow wall.

4. The beverage capsule apparatus of claim 1 wherein the brewing device comprises an injection device that introduces fluid into the capsule through the lateral wall.

5. The beverage capsule apparatus of claim 4 wherein the injection device introduces the fluid into the capsule at a pressure not exceeding 0.2 bars.

6. The beverage capsule apparatus of claim 1 wherein the overflow wall comprises a plurality of puncturing members distributed across an inner surface of the overflow wall.

7. The beverage capsule apparatus of claim 1 wherein the capsule handling members cooperate in engagement to close about the capsule.

8. The beverage capsule apparatus of claim 6 wherein one of the capsule handling members is fixed relative to the brewing device and the other capsule handling member is mobile relative to the fixed capsule handling member.

9. The beverage capsule apparatus of claim 1 wherein the vertical position of the capsule and the overflow wall direct the fluid substantially horizontal and then upward.

\* \* \* \* \*